Patented Aug. 16, 1949

2,479,525

UNITED STATES PATENT OFFICE 2,479,525

OXAZOLIDINES AND A METHOD OF PREPARING THE SAME

Jack T. Thurston, Riverside, Conn., assignor to American Cyanamid Company, New York, N. Y., a corporation of Maine No Drawing. Application January 23, 1946, Serial No. 642,987

12 Claims. (Cl. 260—307.6)

The present invention relates to oxazolidines and to a method for their preparation.

The oxazolidines of the present invention are 2-imino-3-substituted oxazolidines which may be represented by the following structural formula:

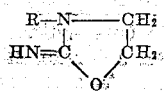

where R may be any aliphatic, aralkyl, aryl or alicyclic radical. These oxazolidines are prepared by reacting a cyanogen halide with a secondary monoethanolamine of the general formula,

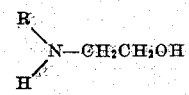

where R may be any of the aforementioned radicals.

The usual reaction of a cyanogen halide with an amine is the formation of substituted cyanamides. It is shown in U. S. Patent No. 2,331,671 that the reaction of a monoalkylol amine with a cyanogen halide yields an alkylol cyanamide. From this it would be expected that a secondary monoalkylolamine would yield a disubstituted cyanamide upon reaction with a cyanogen halide. However, it has been discovered that reaction of a cyanogen halide with secondary monoethanol amines results in cyclization with the formation of the heterocyclic 2-imino-3-substituted oxazolidines.

Generally, the reaction proceeds readily, ordinary temperatures of the order of room temperature or slightly above being sufficient. However, in some cases higher temperatures and pressures are required but such are to be avoided because of side-reactions. Because of the exothermic nature and rapidity of the reaction external cooling is generally employed to permit the cyanogen halide to be introduced at a reasonable rate.

The reaction is most conveniently carried out in a solvent, an inert solvent such as benzene, hexane, and the like, being preferred although a hydroxylic solvent such as ethanol, iso-propanol, and the like, may also be employed but is less desirable because of the presence of the hydroxyl group in the molecule. Likewise, while solvents containing appreciable proportions of water may be used, this should be avoided since a decrease in yield results.

As aforementioned, the substituent replacing one of the N-hydrogens of monoethanolamine to provide an N-substituted monoethanolamine, i. e., a secondary monoethanolamine, may be any aliphatic, aralkyl, aryl, or alicyclic radical.

The cyanogen halide, generally the chloride or bromide but preferably the chloride, may be added to the reaction mixture either as a liquid, as a gas introduced above or below the surface of the reaction mixture, or dissolved in a solvent such as benzene, hexane, $CCl_4$ and the like.

The oxazolidines of the present invention are useful as insecticides and chemical intermediates in the production of pharmaceutical and chemotherapeutic agents, textile and dyeing agents, resins, plastics, and the like. In many cases salts which may be prepared by treating the oxazolidine with acidic materials such as $HCl$, $H_2SO_4$, $H_3PO_4$, acetic acid, propionic acid, phenol and the like are employed instead of the free oxazolidine.

The following examples show the preparation of various 2-imino-3-substituted oxazolidines by means of the process of the present invention:

EXAMPLE 1

*2-imino-3-phenyloxazolidine*

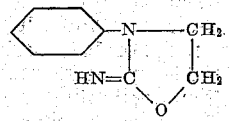

| Reagents | Molar Ratio |
|---|---|
| Phenylethanolamine | 1.0 |
| Benzene | 1.0 |
| Cyanogen chloride | 1.0 |

The phenylethanolamine is dissolved in the benzene, and the resulting solution is cooled to 10° C. Cyanogen chloride is passed in slowly as the reaction is strongly exothermic. The temperature is kept below substantially 5° C., both by adjusting the addition rate of the cyanogen chloride and also by the application of external cooling. The reaction is best carried out in a flask provided with a reflux condenser through which is circulated water sufficiently cold to condense any cyanogen chloride vapors so that this reactant is returned to the reaction vessel. When the addition of the cyanogen chloride has been completed, the external cooling is terminated and the reaction mixture agitated until exothermic tendencies are no longer evidenced. It may be necessary to apply occasional cooling for a short time after the addition of the cyanogen chloride is completed, but this is not always required. When the reaction is terminated, as shown by a drop in temperature, the crystalline solid, 2-imino-3-phenyloxazolidine hydrochloride is filtered, washed with benzene, and dried. If care is not taken to maintain anhydrous conditions a hydrated salt melting at 68.5°–69.5° C. is obtained. However, this salt is easily dehydrated under vacuum to provide a salt melting at 126°–126.5° C. The free 2-imino-3-phenyloxazolidine may be prepared by adding a slight excess of NaOH over the theoretical amount to an aqueous solution of the hydrochloride salt. The free base precipitates and after filtering, washing with water, and drying, it melts at 99°-100° C. The free base is recovered quantitatively from the hydrochloride salt.

EXAMPLE 2

*2-imino-3-butyloxazolidine*

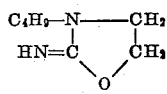

(A)

| Reagents | Molar Ratio |
| --- | --- |
| Butylethanolamine | 1.00 |
| Hexane | 3.80 |
| Cyanogen chloride | 1.00 |
| Benzene | 2.25 |

The butylethenolamine is dissolved in the hexane, and the resulting solution is cooled to 5° C. by means of external cooling. The solution of cyanogen chloride in benzene is added slowly to the agitated reaction mixture, so that the temperature does not exceed 30° C. During the reaction the mixture separates into two liquid phases, and after the addition of cyanogen chloride is completed, the mixture is first stirred at room temperature for about 45 minutes and then at 40°–50° C. for about 20 minutes. The light brown oily phase is separated from the hexane-benzene solution and dissolved in water to form an aqueous solution. This solution is treated with an excess of 10% sodium hydroxide until the pH is 9–10, and extracted several times with ether. After combining and drying the ether extracts, the ether is removed by distillation and 2-imino-3-butyloxazolidine, boiling at 74°–75° C./3 mm., is distilled from the remaining residue. The hydrochloride salt may be prepared by adding HCl gas to a benzene solution of 2-imino-3-butyloxazolidine until a slight excess of the acid is present. Filtration of the precipitate yields a colorless crystalline solid which melts at 145°–147° C.

(B)

| Reagents | Molar Ratio |
| --- | --- |
| Butylethanolamine | 1.0 |
| Cyanogen chloride | 1.0 |
| Sodium hydroxide | 1.0 |
| Benzene | 7.9 |

A slurry of the butylethanolamine and sodium hydroxide, preferably in powdered form, in about two-thirds of the above amount of benzene is prepared. The cyanogen chloride, dissolved in the remainder of the benzene, is added to the slurry at a rate of one mol per 1.25–1.50 hours and the temperature during reaction is maintained at 5°–15° C. After the addition of the cyanogen chloride is completed, the reaction mixture is stirred at room temperature for about 2 hours. The sodium chloride which is formed during the reaction is removed and washed with several small portions of benzene. After combining the washings and the filtrate the benzene is removed under vacuum leaving an oily residual liquid which is purified by distillation to yield 2-imino-3-butyloxazolidine boiling at 74°–75° C./3 mm.

EXAMPLE 3

*2-imino-3-dodecyloxazolidine*

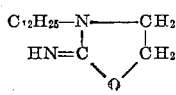

(A)

| Reagents | Molar Ratio |
| --- | --- |
| Dodecylethanolamine | 1.00 |
| Hexane | 6.15 |
| Cyanogen chloride | 1.00 |

The hexane solution of dodecylethanolamine is cooled to 10° C. which causes some of the amine to precipitate. To this agitated slurry is then added the cyanogen chloride, either dropwise or as a gas. The reaction becomes exothermic, and the temperature is allowed to rise to about 35°–40° C., which is substantially the temperature maintained during the addition of the cyanogen chloride. After addition is completed, the reaction mixture is stirred until the temperature drops spontaneously to 20°–25° C. The crystalline waxy 2-imino-3-dodecyloxazolidine hydrochloride is recovered, and after recrystallization from benzene the product melts at 161°–162° C.

To obtain the free base the hydrochloride of 2-imino-3-dodecyloxazolidine is dissolved in water and treated dropwise with the stoichiometric amount of 10% aqueous sodium hydroxide. An insoluble oil, 2-imino-3-dodecyloxazolidine, separates, and after being extracted with ether, the ethereal solution is dried over anhydrous sodium sulfate. The ether is removed and the residue, 2-imino-3-dodecyloxazolidine, is not further purified because it is unstable at the temperatures required for distillation.

(B)

| Reagents | Molar Ratio |
| --- | --- |
| Dodecylethanolamine | 1.0 |
| Cyanogen chloride | 1.0 |
| Sodium hydroxide | 1.1 |
| Benzene | 13.5 |

The dodecylethanolamine, the sodium hydroxide, preferably in powdered form, and the benzene are mixed and thoroughly agitated. The cyanogen chloride is added to this agitated mixture at a rate of substantially 2 mols per hour. During reaction the temperature is maintained at 5°–15° C. After the cyanogen chloride addition is completed, the reaction mixture is stirred at room temperature for about an hour. The sodium chloride which forms during the reaction is removed, and the clear yellow benzene solution may be concentrated to yield the waxy free base, crude 2-imino-3-dodecyloxazolidine. However, since this material is more easily recovered as hydrochloride, the aforementioned yellow benzene solution is best treated with approximately a stoichiometric amount of gaseous HCl at a temperature range of 5°–30° C. After removing the benzene under vacuum, the crude waxy hydrochloride salt is digested with boiling acetone, the solid is filtered, and washed with cold acetone. Additional impurities can be removed by a second digestion in hot acetone. The crystalline 2-imino-3-dodecyloxazolidine hydrochloride obtained therefrom melts at 161°–162° C.

EXAMPLE 4

*2-imino-3-cyclohexyloxazolidine*

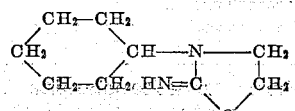

| Reagents | Molar Ratio |
|---|---|
| Cyclohexylethanolamine | 1.0 |
| Cyanogen chloride | 1.0 |
| Sodium hydroxide | 1.0 |
| Benzene | 6.5 |

The benzene slurry of cyclohexylethanolamine and sodium hydroxide, preferably in powdered form, is agitated and cooled to 0°–5° C. while the cyanogen chloride is added at the rate of one mol per 45–65 minutes. During reaction the temperature is allowed to rise slowly to about 15° C., and after the addition of the cyanogen chloride is completed, the reaction mixture is stirred for about 3 hours at approximately 30° C. The sodium chloride formed during the reaction is removed and washed with benzene. The benzene washings and the filtrate are combined and the benzene removed under reduced pressure. The residue is crude 2-imino-3-cyclohexyloxazolidine which is distilled at 115°–116° C./3 mm. The hydrochloride salt may be prepared by treating the free base with approximately a stoichiometric amount of HCl. After this colorless solid is recovered and dried it melts at 197°–198° C.

It may be desirable to recover the 2-imino-3-cyclohexyloxazolidine as the hydrochloride without resorting to the above mentioned vacuum distillation. In this case the benzene filtrate, containing the free base, is treated with gaseous HCl, precipitating colorless 2-imino-3-cyclohexyloxazolidine hydrochloride which melts, after recrystallization from ethanol, at 197°–198° C.

EXAMPLE 5

*2-imino-3-octadecyloxazolidine*

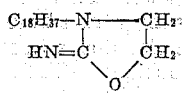

| Reagents | Molar Ratio |
|---|---|
| Octadecylethanolamine | 1.0 |
| Cyanogen chloride | 1.0 |
| Sodium hydroxide | 1.0 |
| Benzene | 11.3 |

The octadecylethanolamine is dissolved in the benzene and the sodium hydroxide, preferably in powdered form, is added to this solution. This stirred mixture is cooled to approximately 15° C., and the cyanogen chloride addition is started. During reaction the temperature is allowed to rise to substantially 30° C. and the addition rate of the cyanogen chloride is approximately one mol per 30 minutes. After the addition of the cyanogen chloride is completed, the reaction mixture is stirred at 20°–30° C. for 1–2 hours. The gelatinous sodium chloride which forms during the reaction is removed by means of a centrifuge and washed with several small portions of benzene. The filtrate and washings containing 2-imino-3-octadecyloxazolidine are combined and cooled to substantially 5° C. A slight excess of gaseous hydrogen chloride over the theoretical amount required is added at a rate of about 2.5 mols an hour, and the temperature is maintained below 25° C. Removal of the benzene and any excess hydrogen chloride under reduced pressure leaves a waxy residue of 2-imino-3-octadecyloxazolidine hydrochloride which is then digested in boiling acetone for approximately 30 minutes. This mixture is then cooled to 0°–15° C., the solid filtered, washed with cold acetone, and air dried. Purification of 2-imino-3-octadecyloxazolidine hydrochloride may also be accomplished by crystallization from ethanol and/or from a mixture of acetone and benzene. The melting point of the purified hydrochloride salt of 2-imino-3-octadecyloxazolidine is 93°–95° C. The free base may be isolated by evaporating the original benzene solution, obtained after the removal of sodium chloride from the reaction mixture. The 2-imino-3-octadecyloxazolidine so obtained is a gummy waxy material which may also be prepared by the addition of substantially a stoichiometric amount of sodium hydroxide to a solution of the hydrochloride salt.

EXAMPLE 6

*2-imino-3-β-carbamylethyloxazolidine*

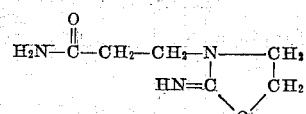

| Reagents | Molar Ratio |
|---|---|
| β-Carbamylethylethanolamine | 1.0 |
| Cyanogen chloride | 1.0 |
| Sodium ethoxide | 1.0 |
| Ethanol | 7.6 |

The β-carbamylethylethanolamine is dissolved in about one-half of the above amount of ethanol, and the solution cooled to about 0°–5° C. The cyanogen chloride is then added at the rate of approximately one mol per 2 hours while the temperature is kept below substantially 15° C. The sodium ethoxide dissolved in the remaining amount of the above ethanol is added to this reaction mixture to neutralize the HCl formed. During this addition, the temperature is not allowed to rise above approximately 30° C., and the reaction mixture is then stirred for 1–2 hours. The sodium chloride which is formed is then removed by filtration, and the resultant clear filtrate is evaporated to dryness at reduced pressure to yield crude 2-imino-3-β-carbamylethyloxazolidine. In order to remove some impurities from this crude 2-imino-3-β-carbamylethyloxazolidine, it is digested in boiling ethanol, cooled, filtered, and washed with a small amount of fresh, cold ethanol. 2-imino-3-β-carbamylethyloxazolidine may also be recrystallized from aqueous ethanol to yield colorless plates melting at 190° C.

EXAMPLE 7

*2-imino-3-p-sulfonamidophenyloxazolidine*

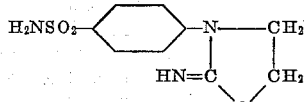

| Reagents | Molar Ratio |
| --- | --- |
| p-Sulfonamidophenylethanolamine | 1.0 |
| Cyanogen chloride | 1.3 |
| Ethanol, absolute | 5.3 |

Cyanogen chloride is added rapidly to the alcoholic solution of the p-sulfonamidophenylethanolamine at substantially 45° C. Only a slight temperature rise occurs and after addition the reaction mixture is stirred for 30–60 minutes, before it is allowed to cool slowly to room temperature. A slight amount of insoluble material is removed by filtration, and the clear alcoholic filtrate is concentrated under vacuum giving a residue of crude 2 - amino - 3 - p - sulfonamidophenyloxazolidine hydrochloride which, after recrystallization from alcoholic acetone, melts at 168°–171° C.

The free material, 2-amino-3-p-sulfonamidophenyloxazolidine may be obtained by adding substantially a stoichiometric amount of sodium hydroxide or sodium ethoxide to the above alcoholic filtrate, removing the resultant sodium chloride, and isolating the substituted oxazolidine.

EXAMPLE 8

*2-imino-3-p-bromophenyloxazolidine*

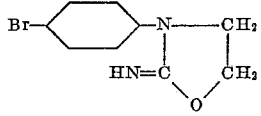

| Reagents | Molar Ratio |
| --- | --- |
| p-Bromophenylethanolamine | 1.0 |
| Cyanogen chloride | 1.0 |
| Benzene | 11.3 |

The p-bromophenylethanolamine is dissolved in benzene and this solution is heated to approximately 60° C. The cyanogen chloride is added to this agitated reaction mixture at the rate of approximately 0.6 mol per hour. The temperature rises only slightly during the addition of cyanogen chloride. After the addition of the cyanogen chloride is completed the solution becomes cloudy and is stirred and heated at substantially 60°–65° C. for about 3 hours. On cooling, crystals of 2 - amino - 3 - p - bromophenyloxazolidine hydrochloride separate which after filtering, washing, and drying melt at 143°–145° C.

The free base, 2 - amino - 3 - p - bromophenyloxazolidine, may be prepared by the addition of approximately a stoichiometric amount of 10% aqueous sodium hydroxide to an aqueous solution of the hydrochloride salt. After filtering the precipitate and crystallizing it from an ether-heptane solution, the purified 2-amino-3-p-bromophenyloxazolidine melts at 114°–115° C.

EXAMPLE 9

*2-imino-3-p-chlorophenyloxazolidine*

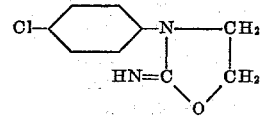

| Reagents | Molar Ratio |
| --- | --- |
| p-Chlorophenylethanolamine | 1.0 |
| Cyanogen chloride | 1.3 |
| Benzene | 9.7 |

The p-chlorophenylethanolamine is dissolved in the benzene and the solution heated to about 45° C. The cyanogen chloride is then added at the rate of 0.6 to 0.7 mol per hour. During reaction the temperature rises about 10° C. and the solution becomes cloudy before the cyanogen chloride addition is completed. The reaction mixture is stirred about an hour at approximately 50° C., and then allowed to cool slowly. Crystalline 2-imino-3-p-chlorophenyloxazolidine hydrochloride separates, which after filtering, washing with benzene, and drying melts at 145°–146° C. Addition of substantially a stoichiometric amount of aqueous sodium hydroxide to an aqueous solution of the hydrochloride salt precipitates the free base. The free base is recovered, and after recrystallization from ethereal hexane, the 2-imino-3-p-chlorophenyloxazolidine melts at 97°–98° C.

EXAMPLE 10

*2-imino-3-butyl-5-phenyloxazolidine*

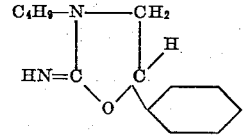

| Reagents | Molar Ratio |
| --- | --- |
| 1-Phenyl-2-butylaminoethanol-1 | 1.0 |
| Cyanogen chloride | 1.0 |
| Sodium hydroxide | 1.0 |
| Benzene | 6.8 |

The 2-phenyl-2-butylaminoethanol-1 is dissolved in the benzene, and the sodium hydroxide, preferably in powdered form, is added to this solution. The resultant agitated mixture is cooled to approximately 5° C. and the cyanogen chloride added at the rate of approximately one mol per hour, during which time the temperature is not allowed to rise above about 25° C. When the cyanogen chloride addition is complete, the reaction mixture is stirred at room temperature for approximately an hour, and the sodium chloride which forms during the reaction, is then removed and washed with small portions of benzene. The washings and filtrate are combined, and the benzene removed under reduced pressure, yielding a residue of crude 2-imino-3-butyl-5-phenyloxazolidine, which is a straw colored oily material that does not crystallize readily. This oily material is redissolved in benzene, and the solution treated with an amount of dry gaseous hydrogen chloride slightly in excess of the theoretical requirements while the temperature is maintained at approximately 0°–5° C. On standing, 2-imino-3-butyl-5-phenyloxazolidine hydrochloride crystallizes from the benzene solution.

After recovery and crystallization from methanolic acetone, the hydrochloride melts at 148°–149° C.

EXAMPLE 11

*2-imino-3-(β-N-octadecylcarbamyl)-ethyloxazolidine*

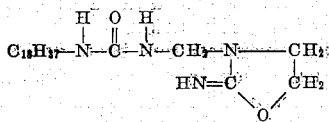

| Reagents | Molar Ratio |
|---|---|
| β-N-Octadecylcarbamylethylethanolamine | 1.0 |
| Cyanogen chloride | 1.0 |
| Sodium hydroxide | 1.0 |
| Benzene | 22.5 |

The β-N-octadecylcarbamylethylethanolamine, the sodium hydroxide, preferably in powdered form, and the benzene are mixed and thoroughly agitated. The cyanogen chloride is added to the mixture at the rate of approximately 1.5 mols per hour, while the temperature is kept below about 35° C. After the addition of the cyanogen chloride is completed, the mixture is stirred for about an hour at 25°–30° C. The sodium chloride which forms during this reaction is removed by filtration and washed with several small portions of benzene. The combined washings and filtrate are cooled to about 5° C. This solution containing 2-imino-3-(β-N-octadecylcarbamyl)-ethoxazolidine is stirred while a slight excess of gaseous hydrogen chloride over the theoretical amount required is added in about two hours. The benzene is removed under reduced pressure, and the sticky residue of crude 2-imino-3-(β-N-octadecylcarbamyl)-ethyloxazolidine hydrochloride is digested in boiling acetone for about an hour, then cooled to 0°–10° C. After filtering under pressure the solid is washed with small portions of fresh, cold acetone to yield slightly impure 2-imino-3-(β-N-octadecylcarbamyl)-ethyloxazolidine hydrochloride melting at 139°–140° C.

The free base 2-imino-3-(β-N-octadecylcarbamyl)-ethyloxazolidine, may be prepared by treating the hydrochloride salt with approximately a stoichiometric amount of sodium hydroxide. After removal of the sodium chloride the free base is a sticky gummy product.

EXAMPLE 12

*2-imino-3-(β-N-hexadecylcarbamyl)-ethyloxazolidine*

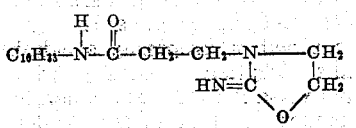

| Reagents | Molar Ratio |
|---|---|
| β-N-Hexadecylcarbamylethylethanolamine | 1.0 |
| Cyanogen chloride | 1.0 |
| Sodium hydroxide | 1.0 |
| Benzene | 17.0 |

The procedure for preparing 2-imino-3-(β-N-hexadecylcarbamyl)-ethyloxazolidine is substantially the same as that reported in Example 11. The cyanogen chloride is added to the benzene slurry of the β-N-hexadecylcarbamylethylethanolamine and sodium hydroxide, preferably in powdered form, at a rate of about one mol per hour. During reaction the temperature is not allowed to rise above approximately 30° C. After the completion of the addition of the cyanogen chloride, the reaction mixture is stirred at room temperature for about 2 hours. After removal of the sodium chloride formed during the reaction, the benzene filtrate is treated with substantially a stoichiometric amount of gaseous hydrogen chloride in a temperature range of 0°–10° C. and the benzene solution concentrated at reduced pressure to yield crude 2-imino-3-(β-N-hexadecylcarbamyl)-ethyloxazolidine hydrochloride. For purification, the crude hydrochloride is digested in acetone, filtered, and dried to yield a waxy solid. The free base may be prepared by the addition of a stoichiometric amount of aqueous sodium hydroxide to the hydrochloride salt to obtain a sticky oily material.

EXAMPLE 13

*2-imino-3-(β-N-tetradecylcarbamyl)-ethyloxazolidine*

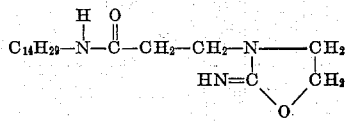

| Reagents | Molar Ratio |
|---|---|
| β-N-Tetradecylcarbamylethylethanolamine | 1.0 |
| Cyanogen chloride | 1.0 |
| Sodium hydroxide | 1.0 |
| Benzene | 17.0 |

The procedure followed in the preparation of 2-imino-3-(β-N-tetradecylcarbamyl)-ethyloxazolidine is essentially the same as that reported in Example 11. The cyanogen chloride is added to the benzene slurry of the β-N-tetradecylcarbamylethylenethanolamine and sodium hydroxide, preferably in powdered form, at a rate of 1.0–1.5 mols per hour while the temperature is maintained below 25° C. After addition, the reaction mixture is stirred for about an hour. The sodium chloride, which forms during the reaction is removed and approximately a stoichiometric amount of gaseous hydrogen chloride is added at a temperature range of 0°–10° C. The benzene is removed at reduced pressure to yield a tan waxy solid, 2-imino-3-(β-N-tetradecylcarbamyl)-ethyloxazolidine hydrochloride. The free base, prepared by treating the hydrochloride with an equivalent of sodium hydroxide is a sticky oily material.

EXAMPLE 14

*2-imino-3-(β-N-dodecylcarbamyl)-ethyloxazolidine*

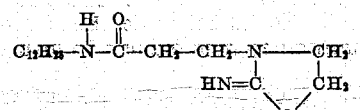

| Reagents | Molar Ratio |
|---|---|
| β-N-Dodecylcarbamylethylethanolamine | 1.0 |
| Cyanogen chloride | 1.0 |
| Sodium hydroxide | 1.0 |
| Benzene | 11.3 |

The procedure for preparing 2-imino-3-(β-N-dodecylcarbamyl)-ethyloxazolinide is substantially the same as that described in the above examples. The cyanogen chloride is added to the benzene slurry of the β-dodecylcarbamylethylethanolamine and sodium hydroxide, preferably in powdered form, at the rate of approximately one mol per hour while the temperature is kept below substantially 25° C. After the addition of the cyanogen chloride is completed the reaction mixture is stirred for about an hour. The sodium chloride which forms in the reaction is removed by filtration and the benzene filtrate is then treated with substantially a stoichiometric amount of gaseous hydrogen chloride at a temperature range of 0°–10° C. Concentration of the benzene under reduced pressure yields 2-imino-3-($\beta$-N-dodecylcarbamyl)-ethyloxazolidine hydrochloride as a slightly sticky waxy solid. Treatment of the hydrochloride with a stoichiometric amount of aqueous sodium hydroxide yields the free base in the form of a viscous oil.

EXAMPLE 15

*2-imino-3-ethyloxazolidine*

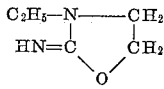

| Reagents | Molar Ratio |
|---|---|
| Ethylethanolamine | 1.00 |
| Cyanogen chloride | 1.00 |
| Sodium hydroxide | 1.05 |
| Benzene | 5.60 |

The agitated benzene slurry of ethylethanolamine and sodium hydroxide, preferably in powdered form, is cooled to about 5° C., and the cyanogen chloride is added to this agitated reaction mixture at the rate of one mol per 60–75 minutes, while the temperature is allowed to reach 20°–25° C. Stirring is then continued for about 2 hours, and the temperature is allowed to reach 30°–35° C. The sodium chloride which is formed in the reaction is removed by filtration and washed with benzene. The combined washings and filtrate are concentrated under reduced pressure. Distillation of the residue yields 2-imino-3-ethyloxazolidine boiling at 59°–60° C./3 mm.

The N-substituted ethanolamines which are not commercially available and which are used as reagents in the present invention are readily prepared by simple and straightforward known chemical methods. Several of the substituted ethanolamines are prepared by the reaction of ethylene oxide with a primary amine. Ethanolamines, similar to that used in Example 10, are prepared by reacting a substituted ethylene oxide with a primary amine. The $\beta$-carbamylethylethanolamine used in Example 6 is prepared by the careful addition of a stoichiometric amount of acrylamide to ethanolamine while the temperature is maintained high enough to insure a clear melt. When this melt is cooled to room temperature the crude solid $\beta$-carbamylethylethanolamine is used without further purification. The preparation of the $\beta$-N-substituted-carbamylethylethanolamines which are used in Examples 11–14 involves several steps. A stoichiometric amount of ethanolamine is carefully added to ethyl acrylate. The resulting ethyl hydroxyethyl-$\beta$-aminopropionate is then treated with either dodecylamine, tetradecylamine, hexadecylamine, or octadecylamine at approximately 100° C. to produce the desired $\beta$-N-substituted-carbamylethylethanolamine. A theoretical amount of ethanol is distilled from this reaction mixture. When cooled to room temperature a waxy solid is obtained, and these $\beta$-N-substituted carbamylethylethanolamines are used in Examples 11–14 without further purification.

While the invention has been described with particular reference to specific embodiments, it is to be understood that it is not to be limited thereto but is to be construed broadly and restricted solely by the scope of the appended claims.

I claim:

1. A 2-imino-3-substituted oxazolidine, said 3-substituted radical being a member selected from the group consisting of alkyl, aryl, aralkyl and cycloalkyl radicals.
2. A 2-imino-3-phenyl oxazolidine.
3. A 2-imino-3-alkyl oxazolidine.
4. 2-imino-3-phenyl oxazolidine.
5. 2-imino-3-butyl oxazolidine.
6. 2-imino-3-dodecyl oxazolidine.
7. A method of preparing a 2-imino-3-substituted oxazolidine, said 3-substituted radical being a member selected from the group consisting of alkyl, aryl, aralkyl and cycloalkyl radicals comprising reacting a cyanogen halide with a secondary monoethanolamine having the formula

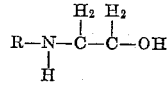

wherein R represents a radical selected from the group consisting of alkyl, aryl, aralkyl, and cycloalkyl radicals.

8. A method of preparing a 2-imino-3-substituted oxazolidine, said 3-substituted radical being a member selected from the group consisting of alkyl, aryl, aralkyl and cycloalkyl radicals comprising reacting cyanogen chloride with a secondary monoethanolamine having the formula

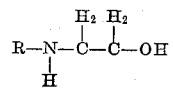

wherein R represents a radical selected from the group consisting of alkyl, aryl, aralkyl, and cycloalkyl radicals.

9. A method of preparing a 2-imino-3-phenyl oxazolidine comprising reacting cyanogen chloride with an N-phenyl monoethanolamine.

10. The method of claim 9 in which the reaction is carried out in a hydrocarbon solvent at a temperature in the approximate range of 0°–60° C.

11. A method of preparing a 2-imino-3-alkyl oxazolidine comprising reacting cyanogen chloride with an N-alkyl monoethanolamine.

12. The method of claim 11 in which the reaction is carried out in a hydrocarbon solvent at a temperature in the approximate range of 0°–60° C.

JACK T. THURSTON.

REFERENCES CITED

The following references are of record in the file of this patent:

Chemical Abstracts, vol. 26, page 2168 (1932).